Figure 1:
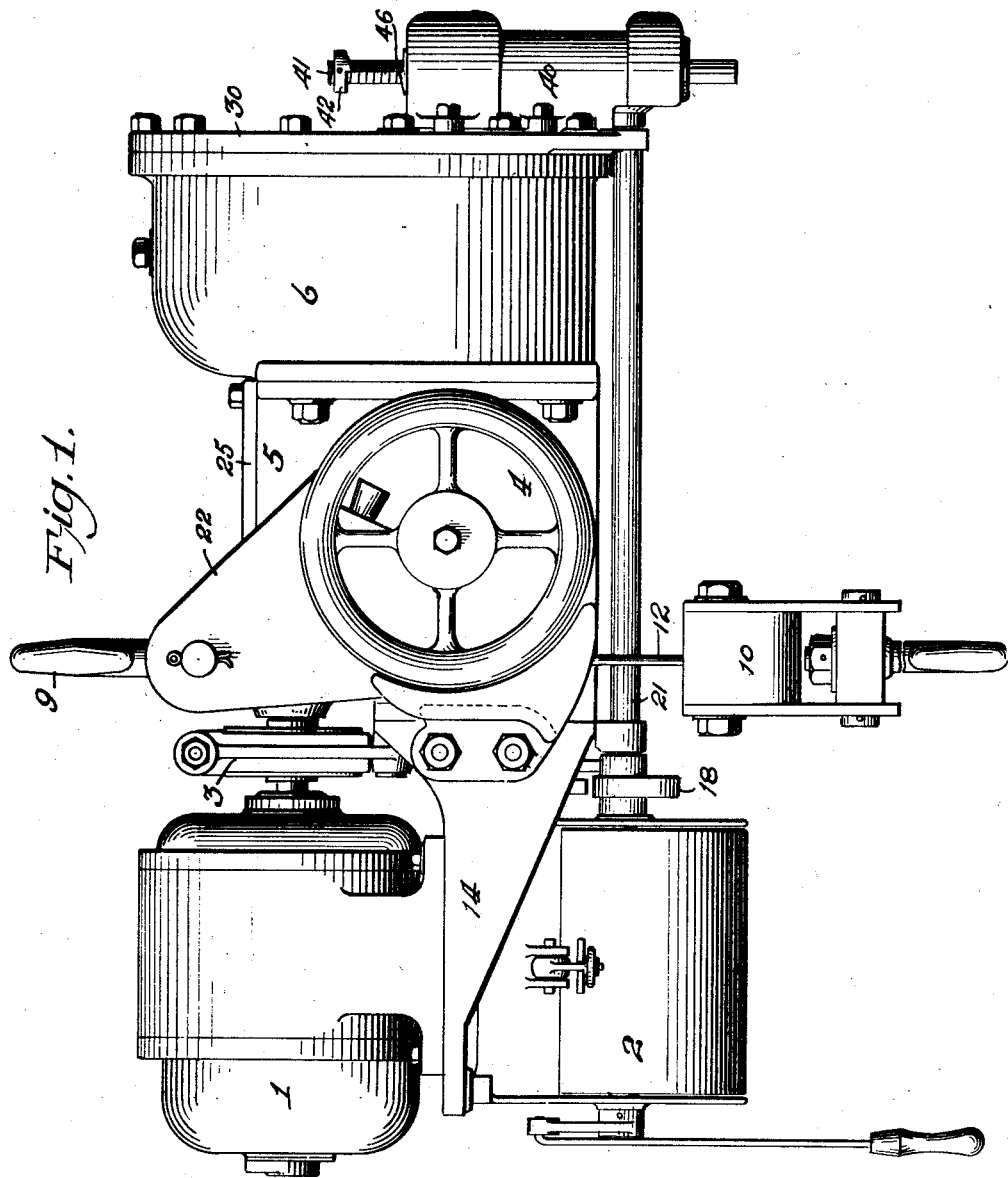

S. E. KALBACH.
PORTABLE ELECTRIC HOIST.
APPLICATION FILED MAR. 21, 1918.

1,277,218.

Patented Aug. 27, 1918.
4 SHEETS—SHEET 1.

Samuel Edward Kalbach,
Inventor by

Attorney

S. E. KALBACH.
PORTABLE ELECTRIC HOIST.
APPLICATION FILED MAR. 21, 1918.

1,277,218.

Patented Aug. 27, 1918.
4 SHEETS—SHEET 3.

Samuel Edward Kalbach,
Inventor
by
Attorney

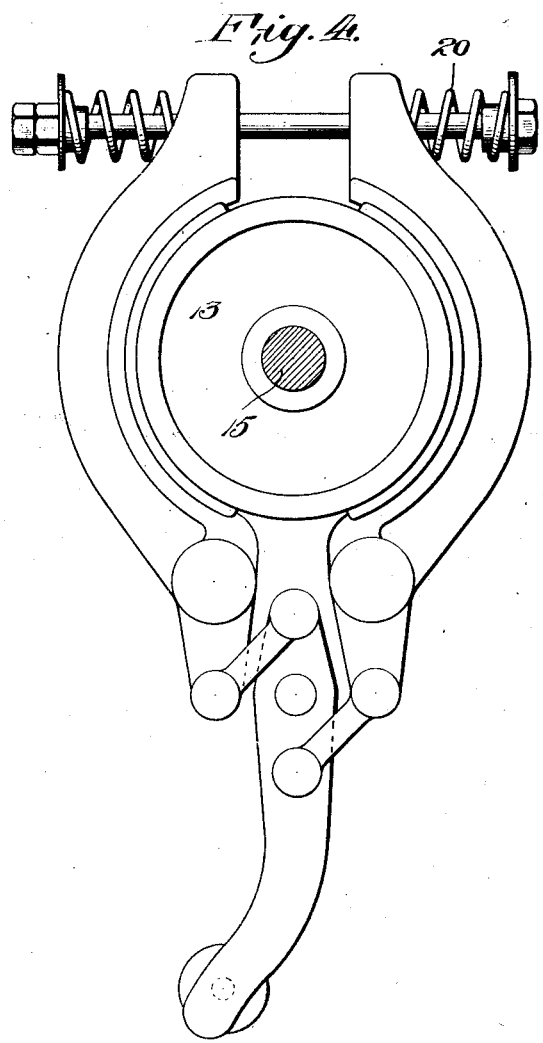

UNITED STATES PATENT OFFICE.

SAMUEL EDWARD KALBACH, OF READING, PENNSYLVANIA.

PORTABLE ELECTRIC HOIST.

1,277,218.

Specification of Letters Patent. Patented Aug. 27, 1918.

Application filed March 21, 1918. Serial No. 223,696.

*To all whom it may concern:*

Be it known that I, SAMUEL EDWARD KALBACH, a citizen of the United States, residing at Reading, in the county of Berks and State of Pennsylvania, have invented certain new and useful Improvements in Portable Electric Hoists, of which the following is a specification.

This invention relates to improvements in portable electric hoists and it is my object in the present invention to provide a high grade hoist at moderate cost, and one that will save time and labor.

The principal object is to provide a hoist of the most rugged construction on the unit plan, assembled in compact form but which will admit of ready access to all parts.

In the drawing forming a part of this application, I have shown, in—

Figure 2:
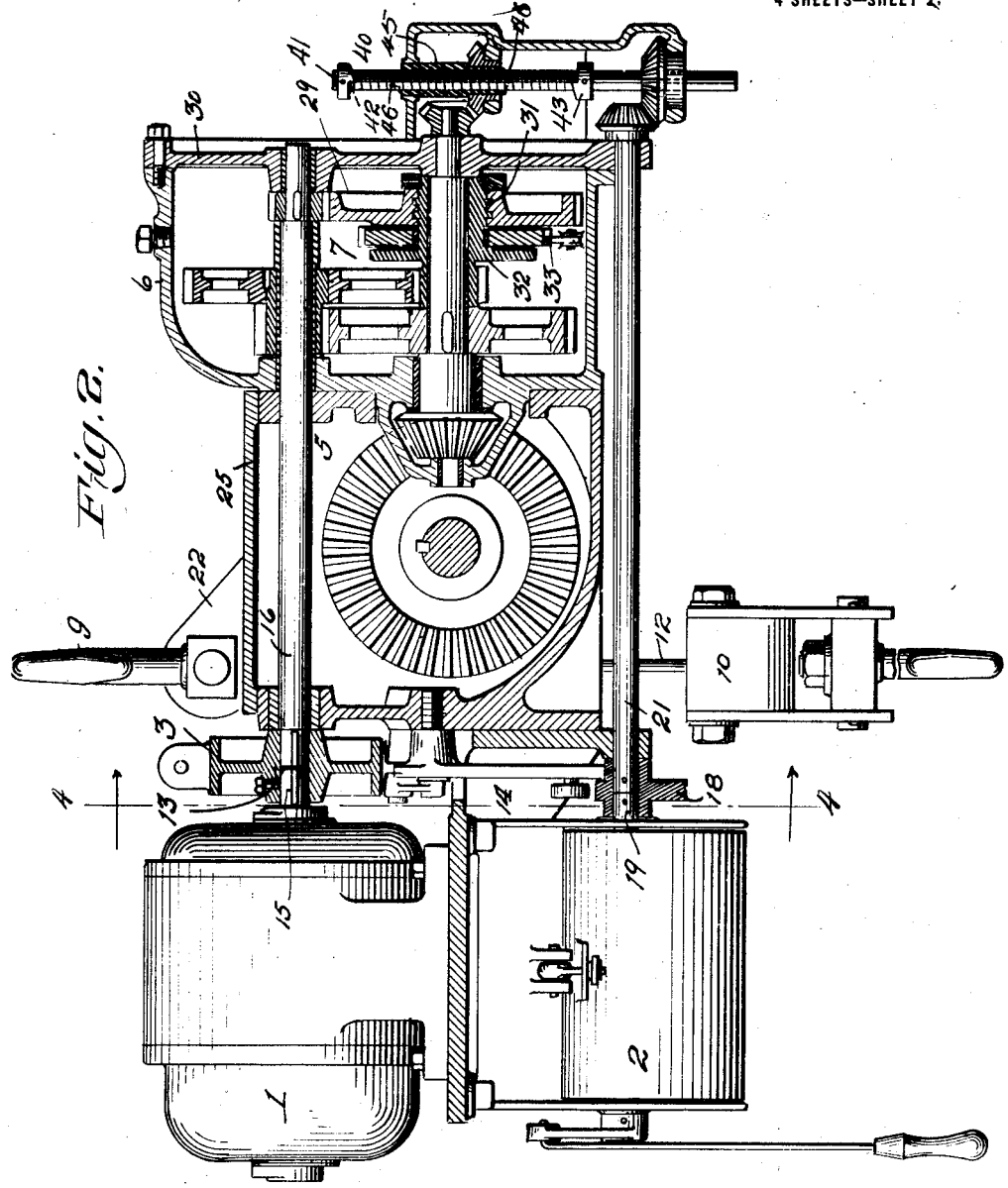
Figure 3:
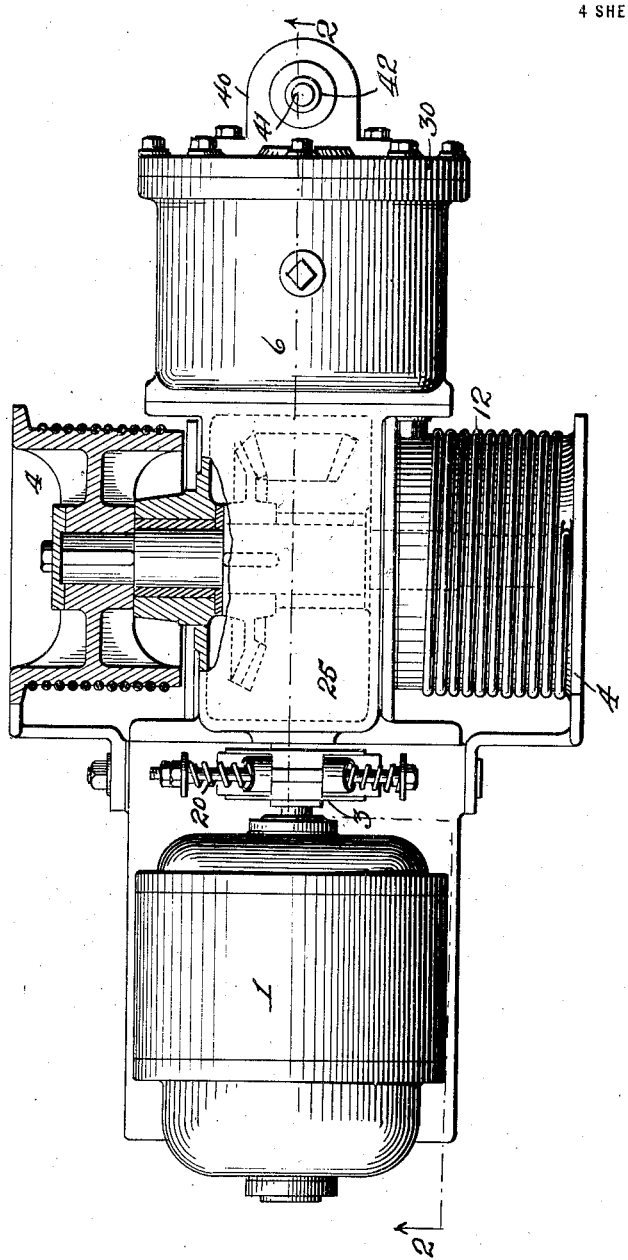

Figure 1 a front elevational view of my hoist,

Fig. 2, a sectional view on line 2—2 of Fig. 3, and

Fig. 3, a plan view, partly in section, of the hoist.

Fig. 4 is a sectional view on line 4—4 of Fig. 2.

The construction comprises the following units, viz: the motor 1, the controller 2, the motor brake 3, the winding drums 4, the gear housing 5, the gear case and gearing 6, the load brake 7, the upper hook 9 and the lower block 10.

Any of the above named units may be completely disassembled without disturbing any of the other units.

The motor and controller are mounted together at one end of the frame 5 and the winding drums and gear case at the opposite end, thus providing a perfectly balanced device under all working conditions.

The winding drums 4 each carry one strand of rope 12 and the load is at all times central, or directly beneath the upper hook or support 9.

The motor and controller are mounted together on a bracket 14 which is securely bolted on the main frame at one end of the hoist. Both may be removed as a sigle unit without interfering with the wiring or other parts.

The motor brake 3 consists of a balanced pulley 13 which also serves as a coupling for the armature and driving shafts 15 and 16, respectively. The brake is mechanically operated by a cam 18 on the controller which also serves as a coupling for the controller shaft and automatic stop shaft 19—21. The compression springs 20 can readily be adjusted to the proper tension to insure sufficient friction between the pulley and brake shoes to stop the motor instantly when current is shut off.

The main frame or drum gear housing 5 is so shaped as to hold a quantity of lubricant sufficient for all the parts within it and is reinforced with two suspension plates 22.

A cover 25 is fitted to the top of the frame, and is removable, affording access to the drum gear and driving pinion inclosed thereby.

The drums 4 are provided with a sufficient number of convolutions of a spiral groove to accommodate the rope in a single layer. The drums are keyed one to each end of the shaft, and the ropes will wind on their respective drums toward each other, thus keeping the load central and preventing twisting of the ropes.

The gear case 6 is so shaped as to inclose the complete train of gears and to contain a sufficient quantity of lubricant. It is securely attached to the main frame at one end of the hoist and is provided with a removable cover 30.

The complete gearing and case may therefore be easily removed from the hoist without disturbing any other part.

The load brake 7 is of the disk and screw type and is so arranged as to form a complete unit in itself and is inclosed in the gear case.

In hoisting, the motor operates a gear 29 on a coarse pitch screw 31 which is formed integrally with the brake pinion 32, thus pinching all the disks tightly together and driving the load through friction. The middle disk is free to turn in the hoisting direction but is prevented from turning in the lowering direction by the pawl 33.

In lowering, the load tends to operate the screw through the gearing, thus pinching the disks tightly together and holding the load by means of friction, the middle disk being prevented from turning in the lowering direction. The pitch of the screw is such that the friction of the disks is always in excess of that produced by the load.

A limit stop 40 is provided which is geared to the counter-shaft of the hoist, and in turn directly connected to the controller shaft. It is adjustable for any lift and will operate at both the highest and lowest positions of the hook. This stop comprises a screw 41, provided with upper and lower cams 42 and 43 respectively and a sleeve 45, provided with lugs or projections 46, adapted for engagement by the cams. It is timed by the number of revolutions of the drum, and when the cam at either end reaches its point of actuation, it will immediately bring the controller to neutral position, shut off the current and prevent the ropes from overrunning the drum. It is impossible for the operator to hold the controller cords in the "on" position when one of the cams contact to effect the stop.

It will be noted that the device in its entirety, comprises a compact hoist, nicely balanced, made up of a number of removable and independent units, any or all of which may readily be removed and replaced without interfering with any other unit and one in which a maximum of power may be developed within a minimum of space and at a relatively low cost.

Having thus described my invention, I claim:—

1. In a portable electric hoist, the combination of a main frame, a motor and a controller mounted together at one end of the frame; a set of hoisting gears and a load brake mounted at the opposite end of the frame; an armature shaft; a motor shaft for conveying rotation from the motor to the gears; a motor brake, a shaft coupling formed integrally with the motor brake for connecting the armature and motor shafts together; a pair of winding drums; a driving shaft for conveying rotary motion to the drums; a cam for mechanically operating the motor brake; a controller shaft, and an automatic stop device, directly connected to the controller shaft and in geared engagement with the driving shaft, said stop device comprising a screw having upper and lower cams and a sleeve for said screw and lugs formed on said sleeve for engagement by the cams for bringing the controller to neutral position.

2. In a portable electric hoist the combination of a main frame, a lubricant receptacle within the frame, a cover therefor; a bracket, a motor and a controller mounted together on the bracket and attached to one end of the frame; a gear case, a lubricant receptacle within the gear case, a set of gears and a load brake located within the gear case, said gear case being mounted on the opposite end of the main frame; an armature-motor shaft, a motor brake and a shaft coupling formed integrally with the motor brake and coupling the two members of the armature-motor shaft together; a pair of winding drums, a cam for mechanically operating the motor brake, a controller shaft, and an automatic controller stop comprising a screw having cams thereon and a sleeve for the screw, lugs on the sleeve adapted for engagement by the cams, said stop being adapted to bring the controller to neutral position at either end of the travel of said screw.

In testimony whereof I affix my signature.

SAMUEL EDWARD KALBACH.